(12) United States Patent
Canova, Jr. et al.

(10) Patent No.: US 6,535,199 B1
(45) Date of Patent: *Mar. 18, 2003

(54) SMART COVER FOR A HANDHELD COMPUTER

(75) Inventors: Francis J. Canova, Jr., Fremont, CA (US); E. Michael Lunsford, San Carlos, CA (US)

(73) Assignee: Palm, Inc., Santa Clara, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 09/586,541

(22) Filed: May 31, 2000

Related U.S. Application Data

(63) Continuation-in-part of application No. 09/573,451, filed on May 16, 2000, and a continuation-in-part of application No. 09/502,169, filed on Feb. 11, 2000, now Pat. No. 6,266,240, and a continuation-in-part of application No. 09/451,630, filed on Nov. 30, 1999, and a continuation-in-part of application No. 09/271,057, filed on Mar. 16, 1999, and a continuation-in-part of application No. 09/244,440, filed on Feb. 4, 1999, and a continuation-in-part of application No. 09/246,781, filed on Feb. 4, 1999, and a continuation-in-part of application No. 09/244,613, filed on Feb. 4, 1999.

(51) Int. Cl.⁷ .................................. G09G 5/00
(52) U.S. Cl. .................. 345/168; 345/156; 345/163; 345/169; 345/179; 345/173; 361/681; 361/683; 361/686
(58) Field of Search ................. 345/163, 169, 345/179, 173, 156, 168; 361/681, 683, 686

(56) References Cited

U.S. PATENT DOCUMENTS

| | | | |
|---|---|---|---|
| 3,744,034 A | 7/1973 | Paul | 340/172.5 |
| 4,559,705 A | 12/1985 | Hodge et al. | 33/1 B |
| 4,762,227 A | 8/1988 | Patterson | 206/328 |
| 4,847,798 A | 7/1989 | Kurashima | 364/708 |
| 4,860,372 A | 8/1989 | Kuzunuki et al. | 382/13 |
| 4,916,441 A | 4/1990 | Gombrich | 345/169 |
| 4,972,496 A | 11/1990 | Sklarew | 382/13 |
| 5,002,184 A | 3/1991 | Lloyd | 206/305 |

(List continued on next page.)

OTHER PUBLICATIONS

Gray, R. et al., "Efficient MC68HC08 programming:reducing cycle count and improving code density", *Dr. Dobb's Journal*, vol. 20, No.5, May 1995, pp. 70–75.

Ruley, J. et al., "Handheld–to–Handheld Combat", *Windows Magazine*, No. 811, p. 55, Nov. 1997.

Dayton, D., "FRx extends reporting power of Platinum Series", *PC Week*, vol. 8, No. 5, p. 29(2), Feb. 1991.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Feigel, C., "IBM, Motorola preview embedded PowerPCs; 403 and 405 processors combine strong performance with low cost", Microprocessor Report, vol. 8, pp. 1–5, May 1994.

Bursky, D., "Evolving DSP chips do more", Electronic Design, vol. 38, No. 23, pp. 51–59, Dec. 1990.

*Primary Examiner*—Richard Hjerpe
*Assistant Examiner*—Abbas Abdulselam
(74) *Attorney, Agent, or Firm*—Van Mahamedi; Hickman Palermo Truong & Becker LLP

(57) ABSTRACT

An accessory device for a handheld computer includes a peripheral portion to detachably couple to an accessory rail of a handheld computer. The accessory device includes a cover portion dimensioned to extend over a front surface of the handheld computer including a display when the peripheral portion is coupled to the accessory rail. The cover portion houses one or more electrical components.

32 Claims, 10 Drawing Sheets

U.S. PATENT DOCUMENTS

| | | | |
|---|---|---|---|
| 5,040,296 A | 8/1991 | Yerger | 30/81 |
| 5,049,862 A | 9/1991 | Dao et al. | 345/179 |
| 5,067,573 A | 11/1991 | Uchida | 178/18 |
| 5,128,829 A | 7/1992 | Loew | 361/683 |
| 5,165,415 A | 11/1992 | Wallace et al. | 600/652 |
| 5,180,891 A | 1/1993 | Trumbo | 178/18 |
| 5,205,017 A | 4/1993 | Wang | 16/367 |
| 5,231,381 A | 7/1993 | Duwaer | 340/712 |
| 5,253,142 A | 10/1993 | Weng | 361/681 |
| 5,283,862 A | 2/1994 | Lund | 345/173 |
| 5,305,394 A | 4/1994 | Tanaka | 382/13 |
| D355,165 S | 2/1995 | Sakaguchi et al. | D14/345 |
| 5,389,745 A | 2/1995 | Sakamoto | 178/18 |
| 5,401,917 A | 3/1995 | Yoshida et al. | 178/18.01 |
| 5,430,248 A | 7/1995 | Levy | 174/50 |
| 5,434,929 A | 7/1995 | Beernick et al. | 382/187 |
| 5,444,192 A | 8/1995 | Shetye et al. | 178/18 |
| 5,448,433 A | 9/1995 | Morehouse et al. | 360/97.02 |
| 5,452,371 A | 9/1995 | Bozinovic et al. | 382/187 |
| D366,463 S | 1/1996 | Ive et al. | D14/345 |
| 5,489,924 A | 2/1996 | Shima et al. | 345/179 |
| D368,079 S | 3/1996 | Ive et al. | D14/411 |
| 5,506,749 A | 4/1996 | Matsuda | 361/683 |
| 5,528,743 A | 6/1996 | Tou et al. | 395/148 |
| 5,530,234 A | 6/1996 | Loh et al. | 235/61 |
| 5,534,892 A | 7/1996 | Tagawa | 345/173 |
| 5,548,477 A | 8/1996 | Kumar et al. | 361/680 |
| 5,550,715 A | 8/1996 | Hawkins | 362/31 |
| 5,555,157 A | 9/1996 | Moller et al. | 361/683 |
| 5,564,850 A | 10/1996 | Nagaoka | 401/37 |
| 5,576,502 A | 11/1996 | Fukushima et al. | 73/862.68 |
| 5,615,284 A | 3/1997 | Rhyne et al. | 382/187 |
| 5,621,817 A | 4/1997 | Bozinovic et al. | 382/189 |
| 5,622,789 A | 4/1997 | Young | 429/7 |
| 5,630,148 A | 5/1997 | Norris | 395/750 |
| 5,635,682 A | 6/1997 | Cherdak et al. | 178/19.01 |
| 5,638,257 A | 6/1997 | Kumar et al. | 361/680 |
| 5,646,649 A | 7/1997 | Iwata et al. | 345/173 |
| 5,657,459 A | 8/1997 | Yanagisawa et al. | 361/681 |
| 5,661,641 A | 8/1997 | Shindo | 361/814 |
| 5,682,182 A | 10/1997 | Tsubodaka | 345/173 |
| 5,698,822 A | 12/1997 | Haneda et al. | 178/18 |
| 5,737,183 A | 4/1998 | Kobayashi et al. | 361/683 |
| D394,449 S | 5/1998 | Shimizu | D18/7 |
| 5,757,681 A | 5/1998 | Suzuki et al. | 708/107 |
| 5,760,347 A | 6/1998 | Notarianni et al. | 345/179 |
| 5,786,061 A | 7/1998 | Banfield | 428/100 |
| 5,810,461 A | 9/1998 | Ive et al. | 312/223.6 |
| 5,821,510 A | 10/1998 | Cohen et al. | 235/375 |
| 5,831,613 A | 11/1998 | Johnston et al. | 345/771 |
| 5,841,901 A | 11/1998 | Arai et al. | 382/187 |
| 5,848,298 A | 12/1998 | Steere, Jr. et al. | 710/62 |
| 5,889,512 A | 3/1999 | Moller et al. | 345/179 |
| D408,021 S | 4/1999 | Haitami et al. | D14/345 |
| D411,179 S | 6/1999 | Toyosato | D14/344 |
| D411,181 S | 6/1999 | Tamaki et al. | D14/345 |
| 5,913,629 A | 6/1999 | Hazzard | 401/33 |
| 5,914,708 A | 6/1999 | La Grange et al. | 345/179 |
| 5,941,648 A | 8/1999 | Robinson et al. | 400/82 |
| 5,942,177 A | 8/1999 | Banfield | 264/134 |
| 5,953,205 A | 9/1999 | Kambayashi et al. | 361/680 |
| D416,001 S | 11/1999 | Tal et al. | D14/347 |
| D417,657 S | 12/1999 | Matsumoto | D14/343 |
| 6,014,009 A * | 1/2000 | Wierzbicki et al. | 320/107 |
| D420,987 S | 2/2000 | Miyahara et al. | D14/346 |
| 6,034,685 A | 3/2000 | Kuriyama et al. | 345/784 |
| D422,271 S | 4/2000 | Kawashima | D14/343 |
| D423,468 S | 4/2000 | Jenkins | D14/342 |
| 6,046,730 A * | 4/2000 | Bowen et al. | 345/168 |
| 6,050,735 A | 4/2000 | Hazzard | 345/179 |
| 6,052,279 A | 4/2000 | Friend et al. | 361/686 |
| D424,533 S | 5/2000 | Kandalepas | D14/342 |
| D426,236 S | 6/2000 | Kim et al. | D14/345 |
| 6,102,721 A | 8/2000 | Seto et al. | 439/160 |
| 6,108,200 A | 8/2000 | Fullerton | 361/686 |
| 6,115,248 A | 9/2000 | Canova et al. | 361/686 |
| 6,129,430 A | 10/2000 | Wu | 312/223.2 |
| 6,151,012 A * | 11/2000 | Bullister | 345/168 |
| 6,151,206 A | 11/2000 | Kato et al. | 361/681 |
| D436,963 S | 1/2001 | Kim et al. | D14/432 |
| 6,178,087 B1 | 1/2001 | Cho et al. | 361/686 |
| 6,181,284 B1 | 1/2001 | Madsen et al. | 343/702 |
| 6,195,589 B1 | 2/2001 | Ketcham | 700/28 |
| D440,542 S | 4/2001 | Hawkins et al. | D14/354 |
| 6,239,968 B1 | 5/2001 | Kim et al. | 361/796 |
| 6,249,276 B1 | 6/2001 | Ohno | 345/173 |
| 6,266,240 B1 | 7/2001 | Urban et al. | 361/686 |
| 6,356,442 B1 * | 3/2002 | Lunsford | 361/686 |

\* cited by examiner

US 6,535,199 B1

SMART COVER FOR A HANDHELD COMPUTER

CROSS REFERENCE TO RELATED APPLICATIONS

This application is a continuation-in-part of application Ser. No. 09/573,451, filed May 16, 2000, entitled "Electronically Enabled Encasement for a Handheld Computer"; application Ser. No. 09/502,169, filed Feb. 11, 2000, entitled "Encasement For a Handheld Computer", now U.S. Pat. No. 6,266,240; application Ser. No. 09/451,630, filed Nov. 30, 1999, entitled "Cover For A Handheld Computer"; application Ser. No. 09/271,057, filed Mar. 16, 1999, entitled "Dual Action Stylus For A Handheld Computer,"; application Ser. No. 09/244,440, filed Feb. 4. 1999, entitled "Handheld Computer"; application Ser. No. 09/246,781, filed Feb. 4, 1999, entitled "Handheld Computer"; and application Ser. No. 09/244,613, filed Feb. 4, 1999, entitled "Handheld Computer"; all of which are hereby incorporated by reference for this application.

BACKGROUND OF THE INVENTION

1. Field of the Invention

This invention relates to the field of handheld computers. In particular, the invention relates to accessory devices for handheld computers.

2. Description of the Related Art

Handheld computers, including personal digital assistants and palm-sized computers, provide the user with a wide variety of functions, such as a calendar, an address book, a task list, a notepad, and a calculator. These handheld computers may be approximately the size of a stack of 3"×5" index cards, sufficiently compact to fit into a shirt pocket.

Handheld computers can be used with covers to protect the device while it is in use or as it is carried between locations. The encasement helps to protect the handheld computer.

Handheld computer may be used with peripheral accessory devices to extend functionality and user for the handheld computer. Electronic peripherals may be attached to the handheld computer. Attaching electronic peripherals, however, also increases the overall size of the combined unit.

SUMMARY OF THE INVENTION

Embodiments of the invention include a cover for a handheld computer. The cover may detachabley couple to the handheld computer through a peripheral portion that inserts into an accessory rail of the handheld computer. The cover may house one or more electrical components to provide additional functionality with the handheld computer. The cover may also include a connector to enable the handheld computer to communicate and/or exchange power with the accessory device.

BRIEF DESCRIPTION OF THE FIGURES

FIG. 5A illustrates the connector on the peripheral portion of the cover in the extended position.

FIG. 5B illustrates the connector on the peripheral portion of the cover in the contracted position.

DETAILED DESCRIPTION

A. Overview

An embodiment of the invention includes an accessory device for a handheld computer. The accessory device is formed into a cover that can be detachably coupled to the handheld computer. When the accessory device is coupled to the handheld computer, a cover portion of the accessory device extends over a surface of the handheld computer. Preferably, the cover portion of the accessory device extends over a portion of the handheld computer that includes a display. The cover portion may include one or more electrical components to perform functions and tasks. In this way, the cover portion may be used to protect the handheld computer, while providing additional functionality through additional electrical components that are carried with the handheld computer. Incorporating the accessory device into a cover also reduces the size of the combined unit formed with the handheld computer.

In an embodiment, the accessory device may include an electrical connector to extend communications to and from the handheld computer. The accessory device may couple to the handheld computer so that the connector of the accessory device mates with a connector of the handheld computer. This enables the functionality of the handheld computer to be expanded to include components of the accessory device.

B. Handheld Computer for use with Smart Covers

Figure 1:
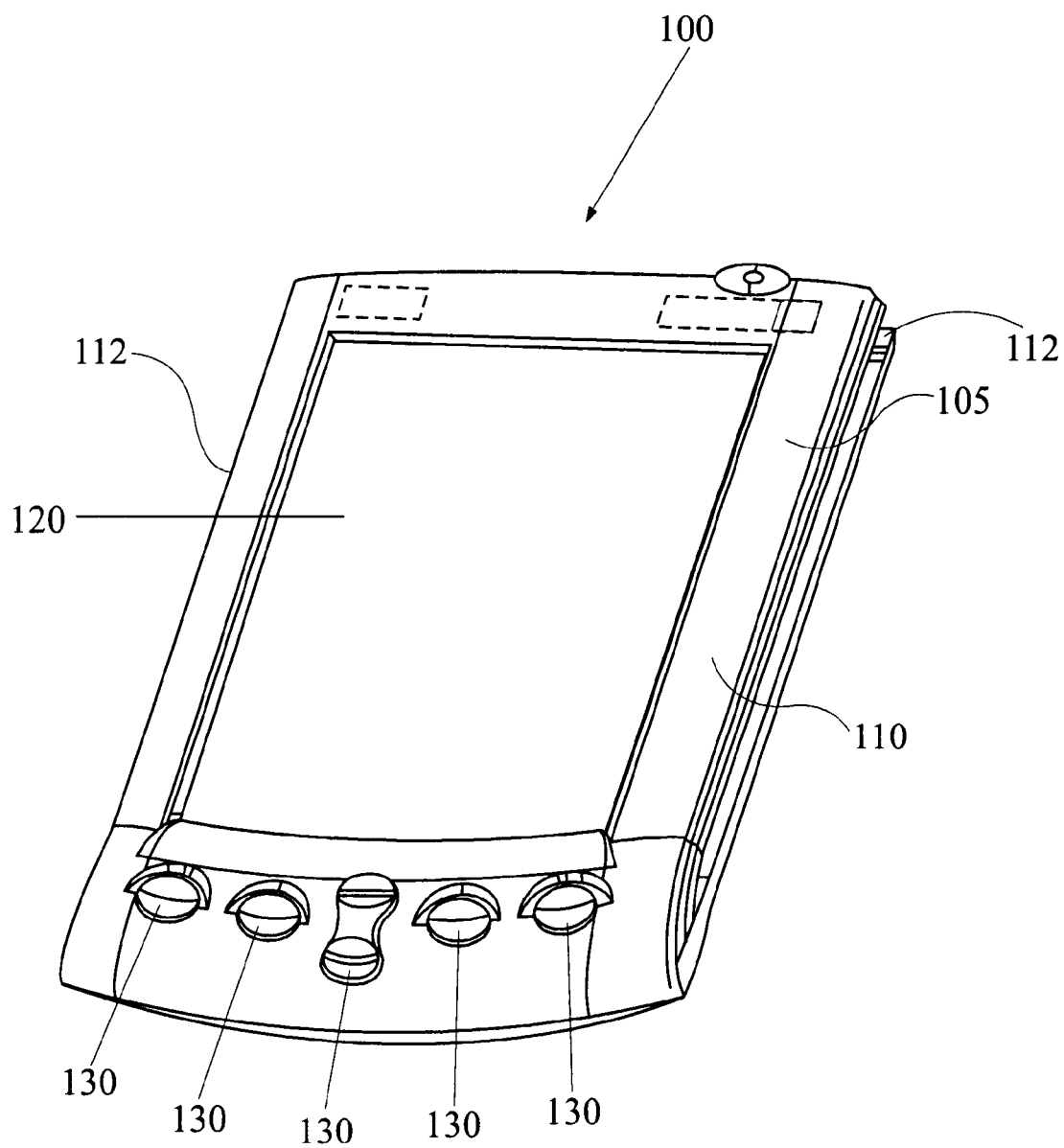
FIG. 1 illustrates a handheld computer for use with an embodiment of the invention.

FIG. 1 illustrates a handheld computer 100 for use with an embodiment of the invention. The handheld computer 100 includes a housing 110 having a front face 105. A display 120 is made accessible from front face 105. The display 120 may be touch-sensitive to allow data entry through contact with a stylus (not shown).

The handheld computer 100 includes a plurality of application buttons 130. The application buttons 130 allow for manipulating applications operated by a processor of the handheld computer 100. Each application button 130 is coupled to the processor of handheld computer 100 so as to launch, configure, or manipulate an application upon being actuated.

The housing 110 includes one or more accessory rails 112. The accessory rail 112 is configured to receive the stylus. In one embodiment, accessory rail 112 also receives a peripheral portion of a cover 200. The peripheral portion of the cover enables the cover 200 to detachably couple with the handheld computer 100. As will be further described, cover 200 includes one or more electrical components to extend the functionality and capabilities of handheld computer 100.

C. Stand-Alone Smart Cover for Handheld Computer

Figure 2:
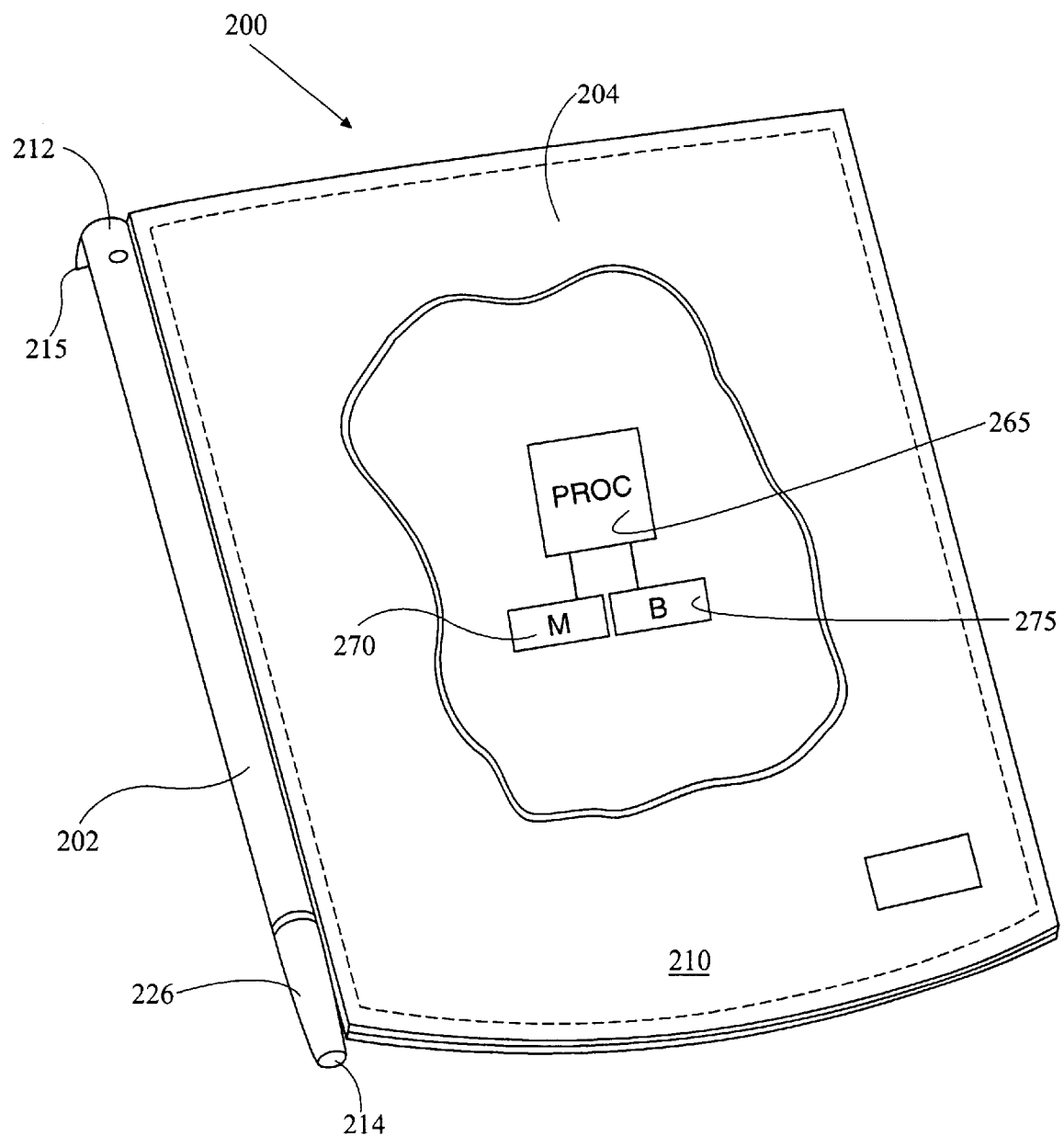
FIG. 2 illustrates an electronically enabled cover for the handheld computer, under an embodiment of the invention.

FIG. 2 illustrates a cover 200 for use with an embodiment of the invention. The cover 200 includes a peripheral portion and a cover portion 204. The peripheral portion of cover 200 detachably engages handheld computer 100. The cover portion 204 provides componentry to extend functionality apart from handheld computer 100.

In an embodiment, cover portion 204 houses components that perform logical operations. The cover portion 204 may be formed from plastic, metal, or other rigid materials suitable for protectively encasing the electrical components. Alternatively, cover portion 204 may be formed from a flexible material such as leather or nylon.

The cover portion 204 is dimensioned so as to extend over a front or back surface of handheld computer 100 when the peripheral portion is engaged to the accessory rail 112 of handheld computer 100. Preferably, the cover portion 204 extends over a display 120 of handheld computer 100 further, cover portion 204 includes contours matching the shape of a housing 110 for handheld computer 100.

In an embodiment, the peripheral portion of cover 200 includes a spine 202. The spine 202 is shaped to slideably couple to an accessory rail 112 of handheld computer 100.

A casing for cover 200 may be constructed as described in U.S. patent application Ser. No. 09/451,630 entitled "Cover for a Handheld Computer", filed Nov. 30, 1999, naming Canova et al. as inventors, and incorporated by reference herein.

The electronic components embedded in cover portion 204 act independently of the internal components of handheld computer 100. In one exemplary embodiment, internal components of the cover 200 include a processor 265, a memory component 270 and a power module 275. The processor may be a RISC type architecture. The memory component 270 may be a FLASH memory, or alternatively a dynamic random access memory (DRAM). The power module 275 may be a rechargeable battery set. The power module 275 may extend to an outlet to receive external power, or a solar unit. Additional components may be provided with cover portion 204, depending on the functions of the cover 200. For example, buttons and/or switches may be provided to control input into the cover 200. Another exemplary component embedded in cover portion 204 includes a universal asynchronous (UART), for performing radio frequency operations, including communications using Bluetooth.

In an embodiment, spine 202 has a circular or elliptical cross-section with an elongated length. The spine 202 includes a top end 212 and a bottom end 214. A tapered segment 226 is adjacent to bottom end 214. The spine 202 is inserted into one of the accessory rails of handheld computer with the bottom end 214 first.

The tapered segment 226 may combine with a narrowing structure of accessory rail 112 to facilitate retention of spine 202. A protrusion 215 extends from spine 202 near top end 212. The protrusion 215 is exposed when spine 202 is inserted into the accessory rail 112 so as to enable spine 202 to be directed out of the accessory rail. In an embodiment, movement of spine 202 traverses a single longitudinal axis of accessory rail 112 to attach the cover 200 to and detach the cover from handheld computer 100.

The spine 202 may be rotationally fixed when inserted into one of the accessory rail 112 of handheld computer 100. The cross-section of spine 202 may be dimensioned so that rotational movement of spine 202 is precluded within either one of the accessory rail 112. In another embodiment, spine 202 is rotationally moveable within the accessory rail 112.

Preferably, the spine 202 is dimensioned and contoured to be interchangeable with a stylus for handheld computer 100. The bottom end 214 may be structured to double as a stylus to enter input into the display 120. A stylus point may be included on spine 202 to provide a contact with display 120.

FIG. 2 illustrates an exterior surface 210 of cover portion 204. The exterior surface 210 may include one or more user-interfaces, or input mechanisms for entering or manipulating data into the electrical components of the cover portion 204. For example, exterior surface 210 may include spring-loaded buttons 219 (FIG. 4) to interface with processor 265.

In another embodiment, an interior surface (not shown) of cover 200 includes one or more user-interfaces or input mechanisms for manipulating data into the electrical components of the cover 200. For example, the embedded circuitry may combine to provide calculator functions based on input received from application buttons residing on the interior surface.

Figure 3:
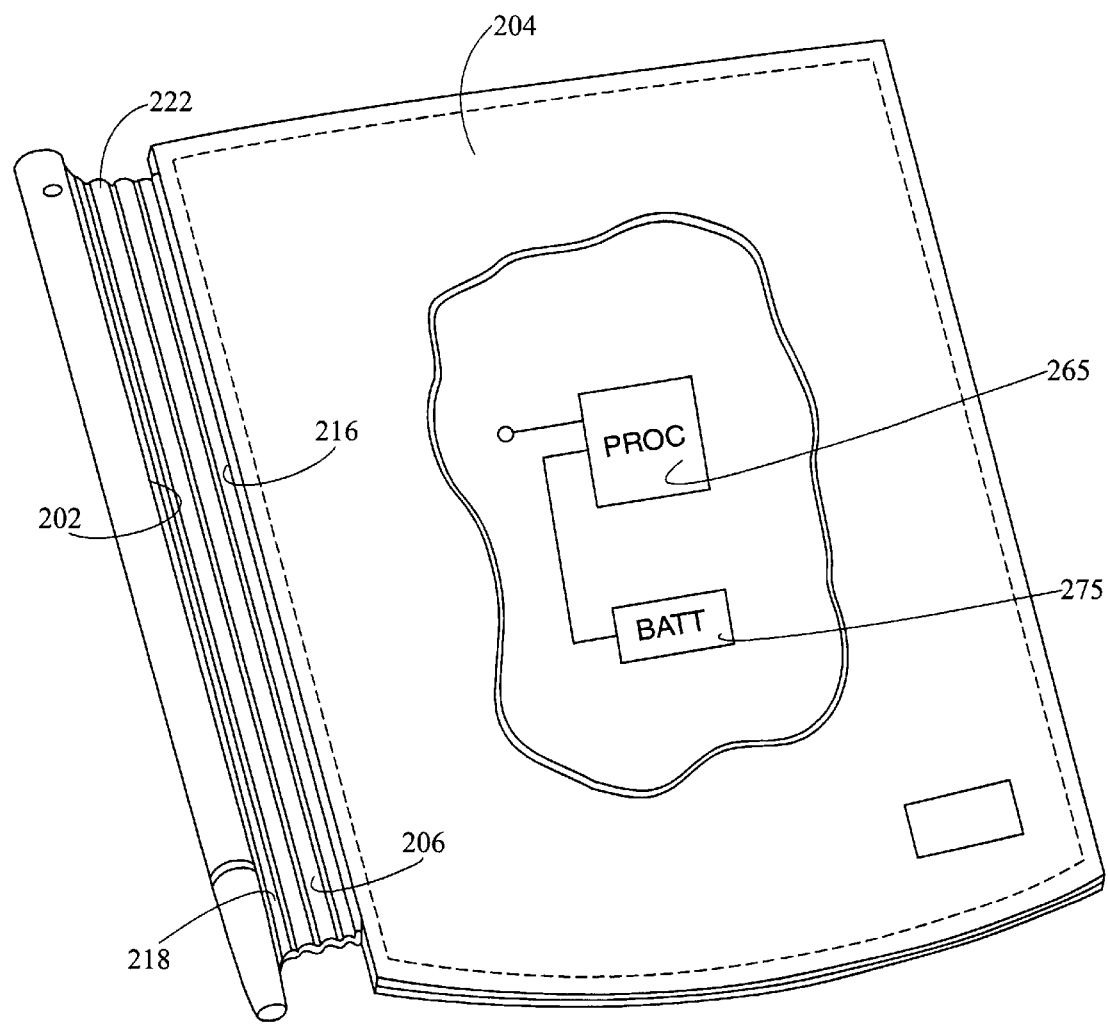
FIG. 3 illustrates another electronically enabled cover for the handheld computer, under an embodiment of the invention.

FIG. 3 illustrates another embodiment of the invention, in which cover portion 204 is joined to spine 202 with a flex portion 206. The flex portion 206 enables the cover portion 204 to be move about spine 202 when the spine is detachably coupled to accessory rails 112. The flex member 206 includes a first end surface 216 extending from the spine 202 and a second end surface 218 that is attached to the cover portion 104. In an embodiment, flex member 206 extends from a length of spine 202 that is accessible through the respective accessory rail 112.

Flex member 206 includes flexure properties to enable the first end surface 216 to be moved about the second end surface 218. In addition, a distance between first end surface 216 and second end surface 218 may provide a slack length to further enable movement of the second end surface 218 about the first end surface 216. Preferably, flex member 206 is formed from a plurality of segments 222 that combine to enable the first and second end surfaces 216, 218 to move about one another. The slack length and flexure properties of flex member 206 combine to permit accurate or radial movement of either the first or second end surface 216, 218 about the other end surface.

In an embodiment, flex member 206 may include wiring or electrical connections. For example, a flex circuit may be embedded in flex member 206.

Figure 4:
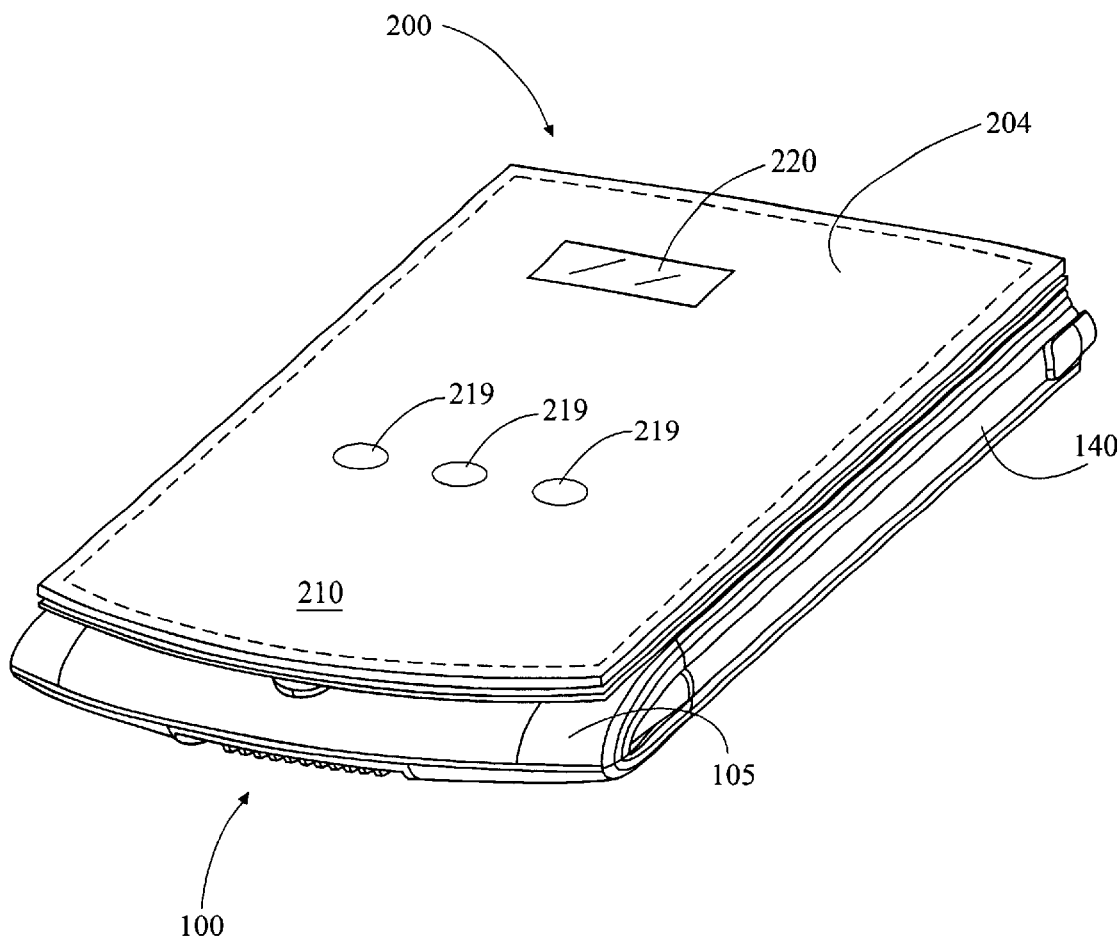
FIG. 4 illustrates the electronically enabled cover coupled to extend over a surface of the handheld computer, under an embodiment of the invention.

FIG. 4 illustrates cover 200 coupled to handheld computer 100. The cover portion 204 extends over the front face 105 of handheld computer to cover display 120 and other components. The spine 202 is coupled to an accessory rail (hidden). The other accessory rail 112 retains a stylus 140.

In an embodiment, exterior surface 210 of cover portion 204 includes a plurality of user-interactive features. The buttons 219 enable users to interact with processor 265 (FIG. 3) of cover 200. In an example such as shown by FIG. 4, cover portion 204 also includes a liquid crystal display 220 to display output to the user. As will be further described, spine 202 may also include a connector that mates with a slot connector of handheld computer 100. The cover 200 then exchanges information with handheld computer 100.

D. Connected Smart Cover for Handheld Computer

In another embodiment, cover 200 electronically couples to handheld computer 100. The peripheral portion of cover 200 may include connector elements that mate with a slot connector positioned within accessory rail 112 of handheld computer 100. An example of a connector for spine 202, along with a slot connector on handheld computer 100, is provided in U.S. patent application Ser. No. 09/282,086, entitled "Connector for a Handheld Computer", filed Jan. 18, 2000, and incorporated by reference herein.

Figure 5A:
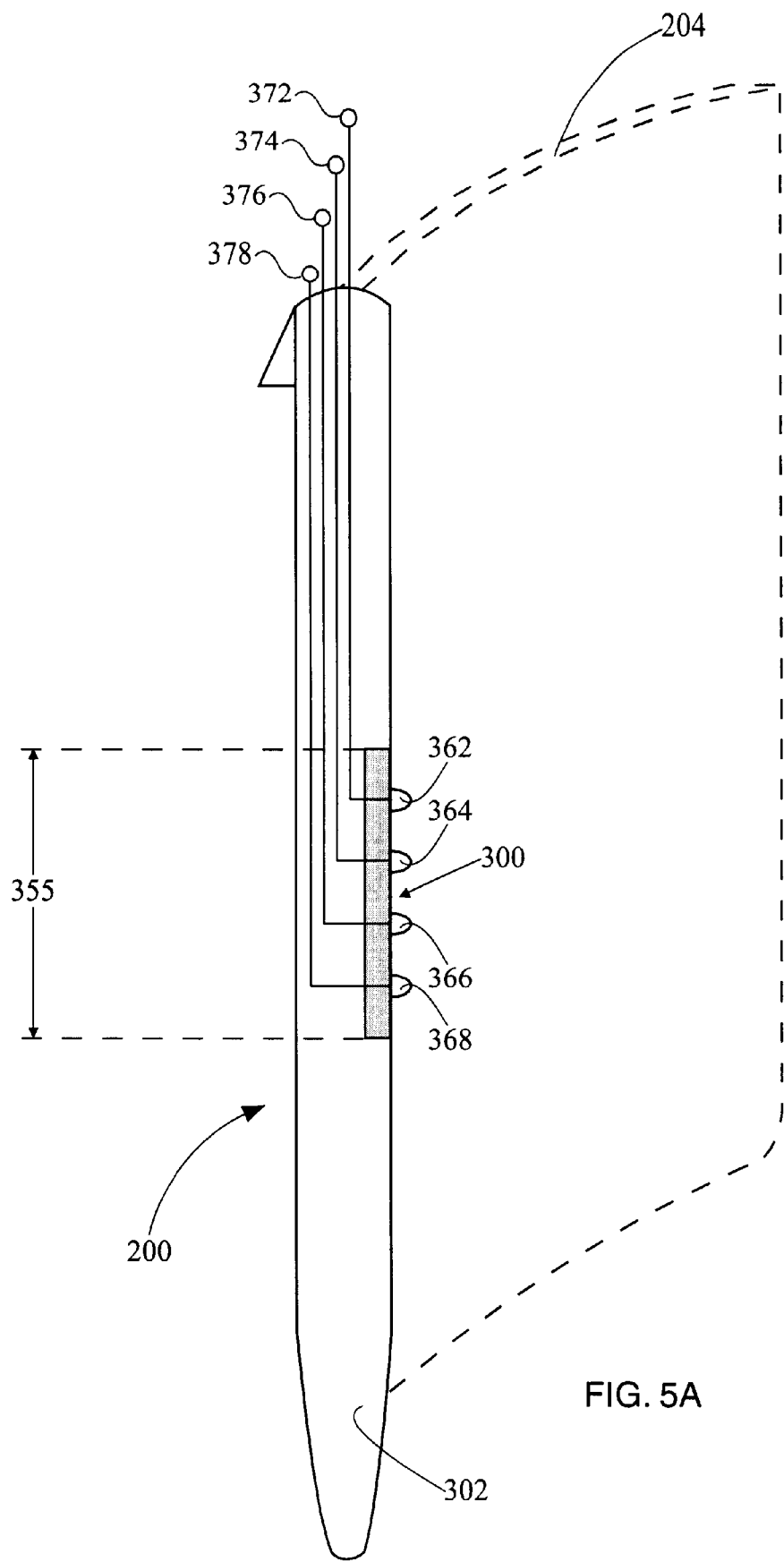
FIGS. 5A–B illustrate a peripheral portion of the cover having a connector for mating with a corresponding connector of the handheld computer, under an embodiment of the invention.

FIG. 5A illustrates a peripheral portion of cover 200 to include a connector 300. The peripheral portion is shaped as an insertable member or spine 302. The spine 302 detachably couples to accessory rail 112. The cover portion 204 may be detachably coupled or integrated with spine 302. Spine 302 is inserted into accessory rail 112. When inserted, the cover portion 204 can extend over a surface or face of handheld computer 100 that includes display 120.

A connector 300 on spine 302, includes a plurality of contact elements 362–368. In FIG. 5A, the contact elements 362–368 are in an extended position. The extended position may correspond to when contact elements 362–368 are outside of accessory rail 112. The extended position may also refer to when contact elements 362–368 are engaged with a corresponding aperture of the slot connector for handheld computer 100, in which case the contact elements 362–368 extend to meet contact elements of the handheld computer 100.

In an embodiment, spine 302 is shaped as stylus 140 (FIG. 4). The connector 300 is located on a lengthwise surface 355 of spine 302. The lengthwise surface 355 includes first contact element 362, second contact element 364, third contact element 366, and fourth contact element 368. More or less contact elements may be provided in other embodiments. The spine 302 includes a first signal line 372, a second signal line 374, a third signal line 376, and a fourth signal line 378. Each signal line 372–378 is electrically connected to contact elements 362–368, respectively.

Each of the contact elements 362–368 may be spring-loaded and moveable from the extended position inward so as to be flush against lengthwise surface 355. The lengthwise surface 355, as used herein, refers to at least the portion of the surface of spine 302 in which contact elements 362-368 are located. The lengthwise surface 355 may be a unitary feature of spine 302. Alternatively, the lengthwise surface 355 may be an integral or attached component formed from an alternative material or fabrication method. For example, lengthwise surface 355 may be insulative, while the rest of spine 302 is conductive. The lengthwise surface 355 may include a radius of curvature, for example, to accommodate staggered contact elements 362–368. The lengthwise surface 355 may also be a rectilinear strip on a body of the spine 302.

Figure 5B:
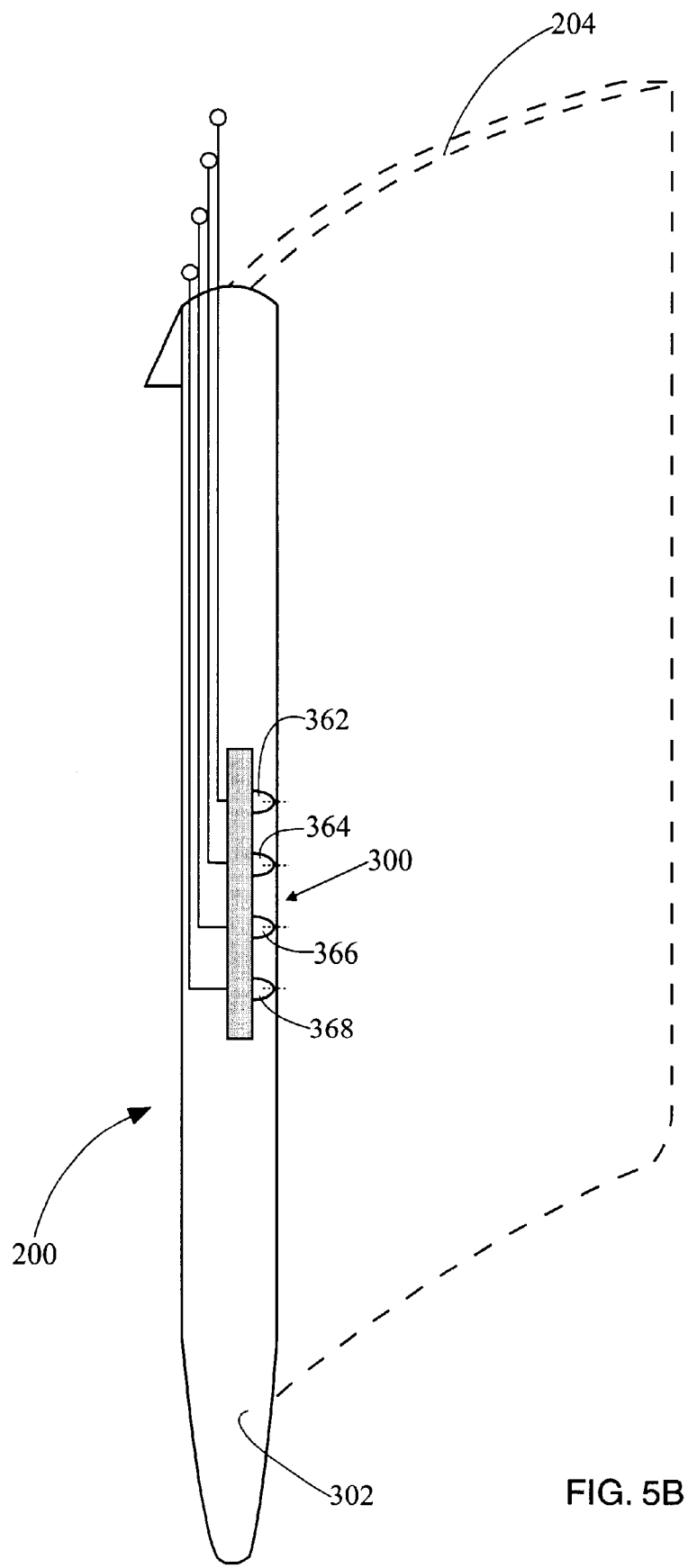

FIG. 5B illustrates spine 302 with the contact elements 362–368 in a contracted state. The contact elements 362–368 may be contracted when spine 302 is being inserted into the accessory rail 112, but before spine 302 is fully inserted or aligned to make contact with the slot connector of handheld computer 100. When inserted, the confines of the accessory rail 112 cause contact elements 362–368 to retract into spine 302. The contact elements 362–368 are spring-loaded to be biased when contracted. Once the slot connector of handheld computer 100 is encountered, the contact elements 362–368 extend out again away from spine 302 to contact respective elements comprising the slot connector of handheld computer 100.

Figure 6:
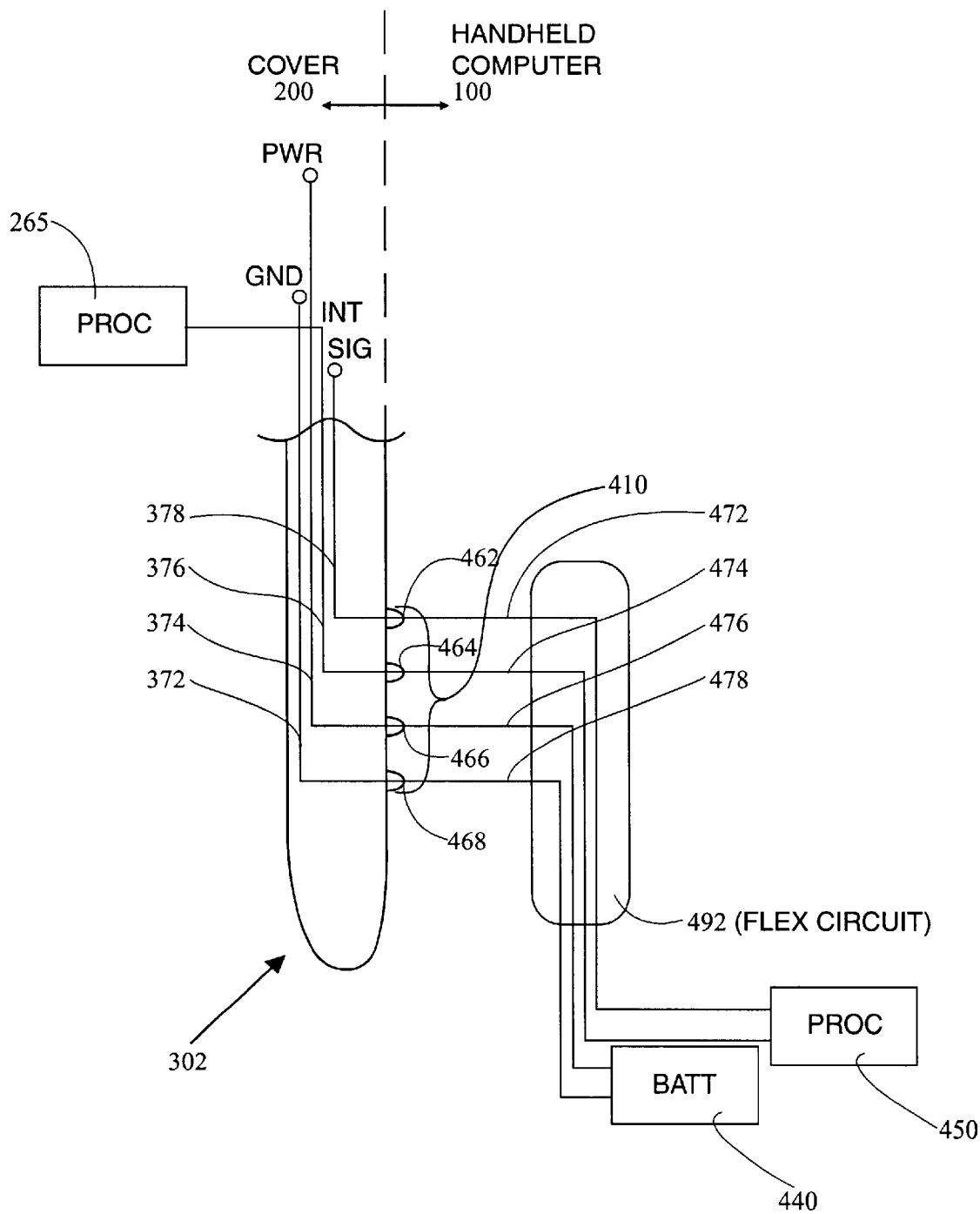
FIG. 6 is a schematic of a peripheral portion of the cover electrically coupled to a slot connector of the handheld computer, under an embodiment of the invention.

FIG. 6 illustrates connector 300 (see FIGS. 5A and 5B) mated with a slot connector 410 of handheld computer 100. As mentioned, slot connector 410 is positioned within one or both accessory rails 112 of handheld computer 100. When spine 302 is inserted, individual contact elements 462–468 of slot connector 410 extend signal lines 472–478 to the components of cover 200.

In an embodiment such as shown by FIGS. 5–6, four contact elements are mated between the cover 200 and handheld computer 100. Other embodiments may incorporate anywhere between one and multiple signal lines, connected through individual contact elements of connector 100 and slot connector 410.

The configuration for the signal lines 472–478 includes two signal lines of slot connector 410 that extend to a battery 440 of the handheld computer 100. The other two signal lines of the slot connector 410 extend to a processor 450 of the handheld computer. Each signal lines 472–478 of the slot connector 410 may be coupled to a component of the handheld computer 100 via, for example, a flex circuit 492.

In an embodiment, a first signal line 472 extends an interrupt signal from one of the components of cover 200 to a processor 450 of handheld computer 100. The first signal line 472 may carry an interrupt signaled from processor 265 to processor 450 of handheld computer 100. The first signal line 472 may also carry an interrupt from processor 450 to processor 265 of cover 200. The first signal line 472 enables a handshaking protocol to be established between processor 265 of cover 200 and processor 450 of handheld computer 100. In an embodiment, the communication between processor 265 and handheld computer 100 through signal line 472 includes an interrupt followed by a data transfer sequence.

The second signal line 474 may extend a clock signal between processor 265 and processor 450. A third signal line 476 may extend power from a battery 440 of handheld computer 100 to the components of cover 200. For example, battery 440 may power processor 265 and memory 270 (FIG. 2). A fourth signal line 478 may extend a ground signal to complete circuits for the communication and power signals.

Alternatively, one or more of the signal lines may be used extend communications between one of the components of cover 200 and a memory component (not shown) of handheld computer 100. For example, data entry into cover 200 may be stored in a FLASH memory component (not shown) of handheld computer 100.

E. Recorder Example of Smart Cover

Figure 7:
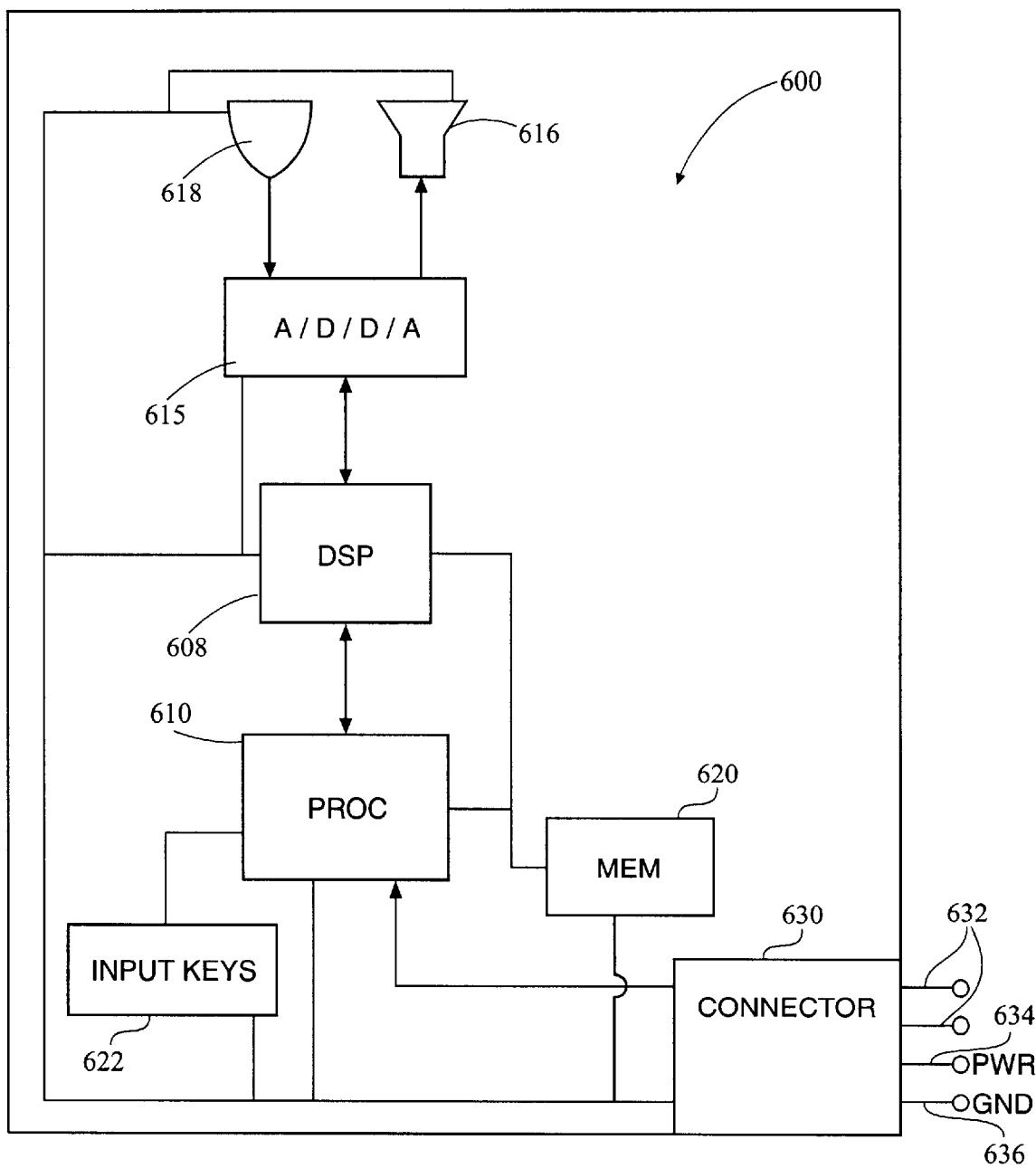
FIG. 7 is a block diagram of a recorder that is configured as a cover for the handheld computer, under an embodiment of the invention.

FIG. 7 illustrates a schematic diagram for a smart cover 600 having audio recording and output functions. The components of cover 600 include a processor 610 that is coupled to a digital signal processor (DSP) 608. The DSP 608 is coupled to converter 615. The converter 615 receives analog audio input from microphone 618. The analog input is converted to a digital format, and signaled to processor 610 via DSP 608. The processor 610 may communicate with a memory 620 to store audio in the digital format. Audio information received through microphone 618 may be digitally stored in memory 620 as data files.

In an embodiment, processor 610 can retrieve stored audio information from memory 620. The retrieved audio information is signaled to converter 615 in the digital format. The converter 615 converts the audio information from the analog format to the digital format. The analog information is outputted in the analog format through one or more speakers 616.

The processor 610 receives input signals from one or more input keys 622. The input keys 622 include, for example, buttons to control operations of processor 610 and memory 620. For example, input keys 622 control processor 610 to receive audio information signaled through microphone 618 and converter 615. The input keys 622 may also signal processor 610 to retrieve audio information, signal the audio information to converter 615, and output the audio information through speakers 616.

As described with previous embodiments, DSP 608, processor 610, converter 615, and memory 620 are embedded into a cover portion 604 (FIG. 8) of cover 600. The microphone 618, speaker 616, and input keys 622 are accessible through exterior surface 610 of cover portion 104.

In an embodiment, cover 600 is electrically connected to handheld computer 100. A connector 630 is configured to couple to a corresponding slot connector (FIG. 9) of handheld computer 100. The connector 630 may be positioned on a spine 602 (FIG. 9) or other peripheral portion of cover 600. The connector 630 may be adapted to mate with a slot connector positioned within accessory rail 112 of handheld computer 100.

As an example, processor 610 (FIG. 7) may retrieve audio data from a memory component of handheld computer 100. The processor 610 may communicate with processor 450 (FIG. 6) of handheld computer 100 to exchange information. Still further, components of cover 600 may be powered from battery module 440 (FIG. 6) of handheld computer 100.

In an embodiment, processor 610 (FIG. 7) extends an interrupt signal line 632 to processor 450 (FIG. 6) of handheld computer 100. The interrupt signal line 632 signals an interrupt whenever, for example, input keys 622 (FIG. 7) are actuated, or processor 610 requires communications with the processor of the handheld computer. Once the interrupt is signaled, interrupt signal line 632 may be used as a data line to exchange audio information and/or control information.

In an embodiment, cover 600 extends a power signal line 634 (FIG. 7) to battery 440 (FIG. 6) of handheld computer 100. The power signal line 634 may extend power to all the components of handheld computer 100. A ground line 636 may also be signaled to handheld computer 100 battery of the handheld computer is then used to power the components of cover 600.

Figure 8:
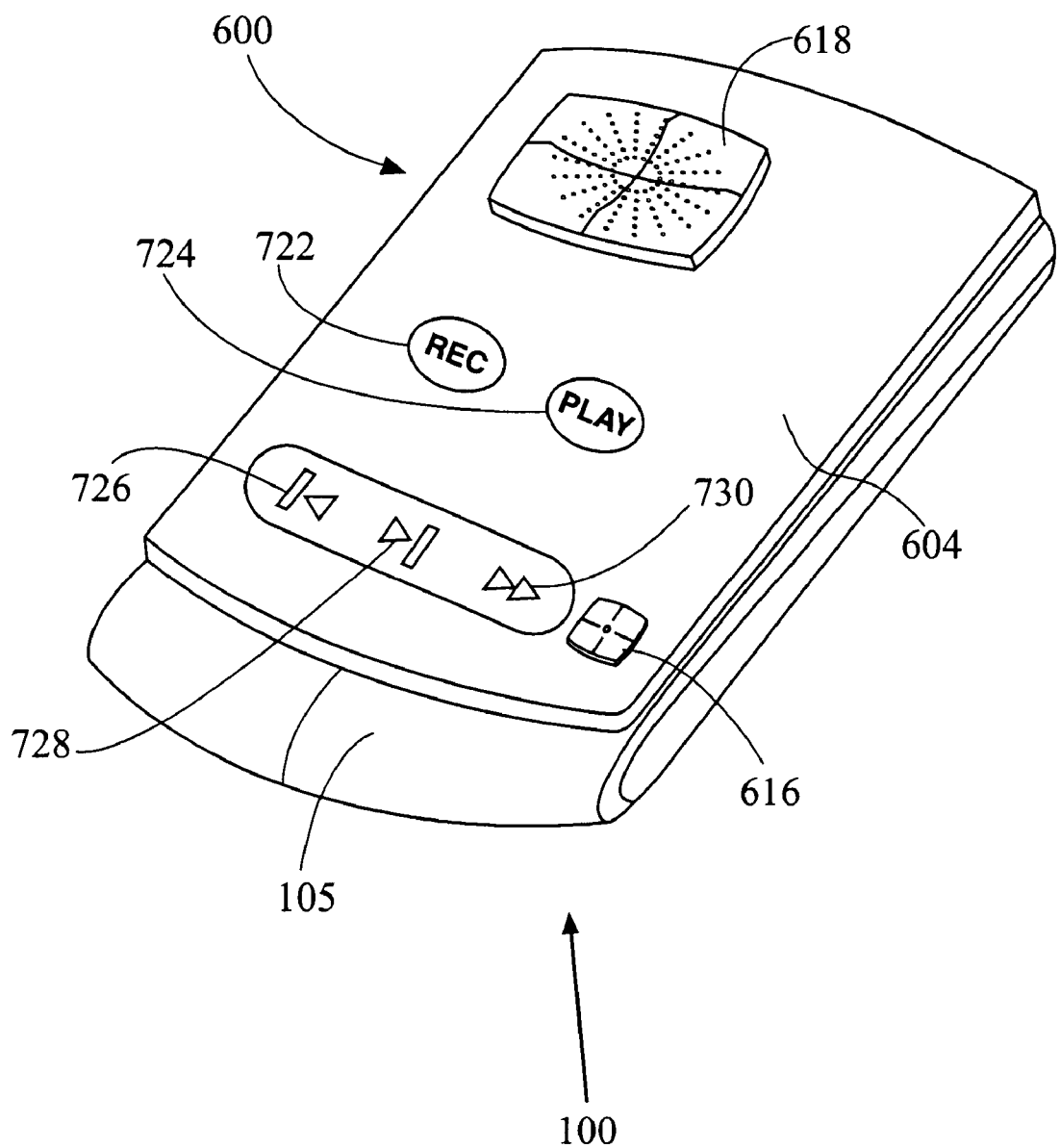
FIG. 8 is an isometric view of the recorder, under an embodiment of the invention.

FIG. 8 is an isometric view of cover 600, including voice recording and output features such as described with FIG. 7. The cover 600 includes a plurality of input keys 722–730 (FIG. 8) to control processor 610 in recording a file for memory 620, or outputting a file from memory 620. A recording input key 722 controls processor 610 to start a recording file. A play input key 724 may be used to signal the processor to retrieve and output the recording file. A rewind key 726 causes processor 610 to rewind in retrieving information from the selected recording file. A pair of fast-forward keys 728, 730 cause processor 610 to move forward in the selected recording file.

Figure 9:
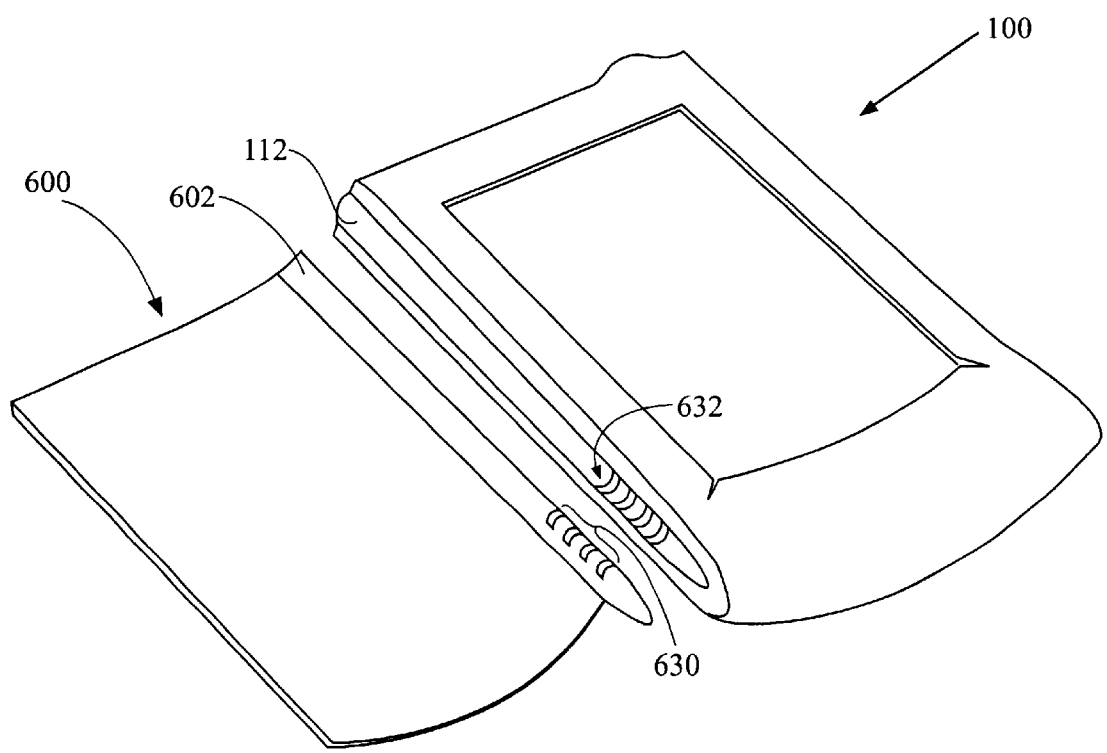
FIG. 9 is an isometric view of a backside of the recorder, showing a connector for exchanging information with the handheld computer, under an embodiment of the invention.

FIG. 9 illustrates cover 600 modified to electrically communicate with handheld computer 100. The cover 600 includes peripheral connector 630 on spine 602. The peripheral connector 630 may extend interrupt signal line 632, power line 634, or a ground signal 636 to processor 450, battery 440 or other component of handheld computer 100. The spine 602 of cover 600 is inserted into accessory rail 112 of handheld computer 100. The handheld computer 100 includes a slot connector 632, similar to the connector described with FIG. 6. Once spine 602 is inserted into accessory rail 112, the connector 630 mates with slot connector 632 to enable communications and/or power to be exchanged between the cover 600 and the handheld computer 100.

F. Alternative Embodiments

In an embodiment, cover 200 may house or otherwise integrate peripheral devices for handheld computer 100, including but not limited to: 2-way alphanumeric pager, keyboard, solar charger, battery based mini-charger, DRAM memory unit, bar code reader, global positioning system (GPS) unit and/or antenna, digital text reader, vibrating unit with alarm, and laser pointer.

In one embodiment, cover 200 houses a rechargeable battery module to extend the operating life of handheld computer 100. In this embodiment, two signal lines may extend from cover 200 to handheld computer 100, via connector 300 and slot connector 410. One signal line 372 (FIGS. 5A–5B) may extend a voltage to an outlet of battery 440 in handheld computer 100. Another signal line 374 (FIGS. 5A–5B) may extend a ground to complete the circuit with the power signal line. In this embodiment, cover 200 may include an outlet for receiving charge from an external source, such as a wall outlet. Alternatively, cover 200 may include a surface having solar panels for recharging the battery module.

G. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. An accessory device for a handheld computer, the accessory device comprising:

a peripheral portion to detachably couple to an accessory rail of a handheld computer;

a cover portion dimensioned to extend over a front surface of the handheld computer including a display when the peripheral portion is coupled to the accessory rail; and one or more electrical components embedded in the cover portion.

2. The accessory device of claim 1, wherein the one or more electrical components includes a processor.

3. The accessory device of claim 2, wherein the one or more electrical components includes a memory.

4. The accessory device of claim 1, wherein the accessory device includes a power module to power the one or more electrical components.

5. The accessory device of claim 1, further comprising an antenna.

6. The accessory device of claim 1, wherein the peripheral portion is dimensioned to slideably engage an accessory rail of a handheld computer.

7. The accessory device of claim 1, wherein the peripheral portion is dimensioned to slideably engage and be retained within an accessory rail extending peripherally along a length of the handheld computer.

8. The accessory device of claim 1, wherein the peripheral portion is dimensioned to slideable engage and be retained within an accessory rail that is adapted to receive a stylus for the handheld computer.

9. The accessory device of claim 1, wherein the cover portion includes a rigid casing.

10. The accessory device of claim 1, wherein the cover portion includes a flexible casing.

11. The accessory device of claim 1, wherein the one or more electrical components include an electrical device selected from a group consisting of 2-way alphanumeric pager, keyboard, solar charger, battery based mini-charger, memory unit, bar code reader, global positioning system unit and/or antenna, digital text reader, vibrating unit with alarm, and laser pointer.

12. The accessory device of claim 1, further comprising a flex portion that joins the cover portion to the peripheral portion.

13. The accessory device of claim 1, wherein the cover portion is moveable when the peripheral portion is retained within the accessory rail so as to move between a position adjacent to a front face of the handheld computer to a surface adjacent to a back face of the handheld computer.

14. The accessory device of claim 1, further comprising a connector that mates with a connector of the handheld computer to extend communications between the one or more components and a processor of the handheld computer.

15. The accessory device of claim 14, wherein the connector is positioned on a surface of the peripheral portion.

16. The accessory device of claim 1, wherein the connector is positioned on a surface of the peripheral portion to mate with a rail connector of the handheld computer.

17. The accessory device of claim 16, wherein the connector includes at least one connector element for signaling an interrupt to a processor of the handheld computer via the slot connector.

18. The accessory device of claim 16, wherein the connector includes at least three connector elements that connect to corresponding elements of the slot connector on the handheld computer, the connector of the accessory device including a first connector element for signaling an interrupt to a processor of the handheld computer, a second connector element to extend a power signal from the handheld computer to components of the accessory device, and a third signal line extending a ground between the accessory device and the handheld computer.

19. An accessory device for a handheld computer, the accessory comprising:
    a cover portion that houses a recorder, the recorder including:
        a microphone to receive an audio input;
        a converter to convert the audio input from an analog format to a digital format;
        a memory to store the audio input in the digital format;
        a processor to signal the audio input to the memory; and
    a peripheral portion that is extended from the cover portion to detachably couple to an accessory of the handheld computer.

20. The accessory device of claim 19, further comprising a speaker, wherein the processor signals the audio input to the converter to convert the audio input to the analog format, the audio input being signaled in the analog format to the speaker.

21. The accessory device of claim 20, further comprising a plurality of input keys to control the recorder.

22. The accessory device of claim 21, wherein one of the input keys includes a first button to signal the recorder to begin recording a voice input.

23. The accessory device of claim 22, wherein one of the input keys includes a second button to signal the recorder to retrieve and playback an existing file stored in the memory.

24. The accessory device of claim 19, wherein the peripheral portion is dimensioned to slideably engage an accessory rail of a handheld computer.

25. The accessory device of claim 19, wherein the peripheral portion is dimensioned to slideable engage and be retained within an accessory rail that is adapted to receive a stylus for the handheld computer.

26. An accessory device for a handheld computer, the accessory device comprising:
    a spine that slideable engages an accessory rail of the handheld computer to detachably couple the accessory device to the handheld computer;
    a cover portion that extends over a display of the handheld computer;
    one or more electrical components embedded in the cover portion; and
    a connector positioned on a surface of the spine to mate with a slot connector of the handheld computer, the slot connector being positioned within the accessory rail of the handheld computer.

27. The accessory device of claim 26, wherein the connector includes a data connector element on the surface of the spine that extends at least an interrupt signal line from a processor of the accessory device to the slot connector of the handheld computer.

28. The accessory device of claim 26, wherein the connector includes a power connector element on the surface of the spine that extends at least a power signal line for powering components of the accessory device, the power signal line extending to couple to the battery of the handheld computer via the slot connector.

29. The accessory device of claim 26, wherein the connector includes a power connector element on the surface of the spine that extends at least a power signal line for powering components of the handheld computer, the power signal line extending to couple to an outlet of the battery of the handheld computer via the slot connector.

30. A handheld computer assembly comprising:
    a handheld computer including:
        a processor;
        an accessory rail peripherally extending along a length of the handheld computer; and
        a slot connector positioned with the accessory rail to extend communications to and from the processor;
    an accessory device including:
        a cover portion;
        a processor embedded in the cover portion;
        a spine that slideably engages the accessory rail to detachably couple the accessory device to the accessory rail; and
        a connector positioned on a surface of the spine to extend communications from the processor of the accessory device to the processor of the handheld computer.

31. The accessory device of claim 1, wherein the one or more electrical components combine to function as an image capturing device.

32. The accessory device of claim 30, wherein the image capturing device is a digital text reader.

* * * * *